Dec. 13, 1960      J. E. STARR      2,963,773

STRAIN GAGE INSTALLATION AND METHOD OF INSTALLING

Filed Feb. 11, 1959

INVENTOR
James E. Starr
BY Wm. R. Glisson
ATTORNEY

United States Patent Office
2,963,773
Patented Dec. 13, 1960

2,963,773

STRAIN GAGE INSTALLATION AND METHOD OF INSTALLING

James E. Starr, Rosemont, Pa., assignor, by mesne assignments, to The Budd Company, Philadelphia, Pa., a corporation of Pennsylvania Filed Feb. 11, 1959, Ser. No. 792,572

3 Claims. (Cl. 29—155.5)

This invention relates to a strain gage installation and method of making the installation, also an improved gage unit, and has for an object the provision of improvements in this art.

One of the particular objects of the invention is to provide a strain gage installation which is suited for high tempertaure operation.

Another object is to provide a strain gage installation in which the gage is located very close to the surface of the test body.

Another object is to provide a strain gage installation in which the gage is uniformly at the same distance from the specimen whereby for each and every installation the same predetermined close arrangement is assured.

Another object is to provide a strain gage installation which has great flexibility so as to conform to surfaces of small radius of curvature.

Another object is to provide a strain gage installation which will not readily deteriorate with age and high temperature.

Another object is to provide a strain gage installation which can be quickly and easily made, even by relatively inexperienced workers.

Another object is to provide a strain gage unit which is adapted for use in making the improved installation and which especially facilitates the making of connections from the gage element terminals to the take-off conductor leads.

The above and other objects and advantages of the invention will be apparent from the following description of an exemplary embodiment, reference being made to the accompanying drawings, wherein.

Figure 1:
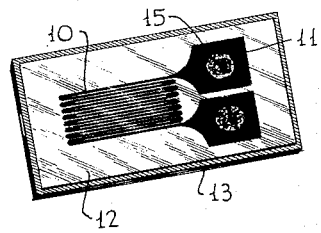
Fig. 1 is a perspective view of a strain gage unit embodying the present invention.

As shown in Fig. 1, the gage unit as supplied for installation comprises a gage grid 10 of thin metal foil film or leaf with conductor terminal tabs 11 and a backing carrier 12 of very thin, flexible heat-resistant material, such as a sprayed-on adherent epoxy coating, silicone sheet, or the like. One type of carrier is sufficiently transparent to make the metal gage visible through it, which is an aid in installing the gage. Such a transparent backing sheet is shown in Fig. 1. Gage units like this have been made and used before where the backing layer was glued to the test body and the gage grid was disposed outward of the backing layer. In the present installation however, the gage grid is disposed adjacent the test body with the carrier backing layer disposed outward thereof. This requires that provision be made for connecting the grid terminals to the conductor leads without removing the backing layer. A protective sheet 13 of relatively thick flexible material is placed over the metal side of the unit as shipped. This rubber-like sheet has slight adhesion to remain in place but can be readily stripped off when the gage is installed.

Here it is to be noted that there have been two previously known types of "upside-down" gage installations. In one type the gage is put down on a layer of adhesive on a test body while the carrier backing layer still adheres to the gage, the backing layer later being stripped off and leads connected to the gage terminals. In the other type of the gage is first stripped from the backing layer, then laid down on an adhesive layer and the lead connections made. In both of these installations such great skill in application is required that the installations are used only where more easily made installations cannot be used. On metallic test bodies the danger of shorts is great, the danger of tearing or mis-shaping the gage is difficult to avoid, and the adhesive layer cannot easily be kept at a predetermined thickness.

Another known high temperature type of gage comprises a grid sandwiched between thin layers of a heat-resistant material like "Bakelite" but these gages are quite stiff and, even with the thinnest possible covering layer, the gage grid is much too far from the test body for the kind of installation contemplated herein.

In the present installation the carrier backing layer, which is left permanently on the gage in the installation, is, in one form, provided with means for making connections through the backing layer. Here holes 14 are left above the gage terminals and to prevent the holes from being filled with adhesive during installation and also to prevent the joining points of the leads from becoming soiled before use, the holes 14 are filled and covered with a suitable material 15, such as a rubber-like silicone compound, which has high heat resistance, which will properly adhere, and which can be readily peeled off at the time the installation is made.

Figure 2:
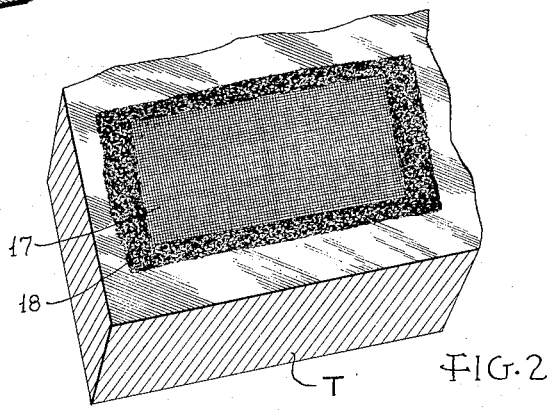
Fig. 2 is a perspective view of a test body with an openwork insulating sheet applied in preparation for applying the gage.
Figure 3:
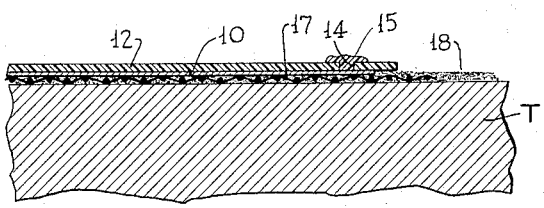
Fig. 3 is a section through a specimen and installation prior to the attachment of conductor leads.

In making the installation, as shown in Fig. 2, there is used a very thin, flexible, heat-resistant, open or perforate sheet 17 of insulating material of uniform thickness between the test body T and the gage 10. A thin woven glass fabric of 0.001" or less thickness has been found to be very suitable for this purpose. It is secured to the test body by cement 18, the cement also securing the gage to the test body. The metal grid has a thickness in the order of .000100" to .000250".

The insulating sheet 17 is larger than the gage unit and its terminal tabs by an extent sufficient to assure that no part of the gage installation will be shorted to the test body. The insulating sheet may be put in place and the cement applied over it or the cement may be applied first and the insulating sheet laid down on it. In any case, the gage is put on while the cement is still freely flowable and is pressed down to expell all of the cement therebeneath except that which lies in the pores of the fabric and the very thin layers which wet the test body and the gage. Practically, the gage is spaced from the test body only by the thickness of the insulating layer and this thickness does not vary either in a single installation or from one installation to another.

The pressure required is much less than that needed to force cement from beneath an imperforate sheet and there is not left the considerable thickness between surfaces which is required to make a good bond through a continuous layer of cement. Here the cement layer needed to make the bond lies mainly in the pores of the insulating sheet. Also, where there is no separate relatively thick layer of cement there is little tendency for the gage to creep due to softening and flowing of the cement in use. The insulating material also is of a type which has little tendency to change length with changes of temperature and is so very thin that it offers only negligible resistance to change in length of the test body.

The cement which is at present preferred is a recently developed high-temperature resistant epoxy resin. Its nature is not fully known but it is marketed as Mithra No. 200 and Mithra No. 201 cement. Another suitable material is a phenolic adhesive known as Palmer BC-6035.

Figure 4:
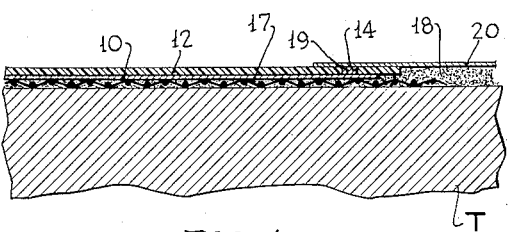
Fig. 4 is a view like Fig. 3 after the leads have been connected.

After the gage has been cemented to the test body the holes are uncovered by removing the material 15 to provide access of solder 19 to the terminals and the conductor leads 20 are soldered on, as shown in Fig. 4. The leads could, instead, be welded or soldered on during manufacture of the unit if their presence during installation is not objectionable. They may be secured to either face of the lead tabs. Or the gage terminal tabs could be made longer and left exposed beyond the end of the carrier backing sheet for access in making connections.

The carrier backing sheet 12 is left in place after installation to protect and insulate the gage. It does not have to be as highly heat resistant here as it would if placed between the gage and test body, as is done for some other types of installations and uses. However, the backing sheet is such that it will safely withstand temperatures above 400° F. without deterioration. The gage installation itself is capable of operating satisfactorily up to about 500° F.

The metal foil of the grid may be treated in several ways to give better adhesion. The kind of treatment given will depend to some extent on the kind of alloy used in the gage. For example, an oxide layer can be formed by chemical treatment. Or a thin layer of another metal may be formed on the gage metal by electroplating or other known methods. Such a layer can be treated to provide an oxide surface or otherwise, if needed, without disturbing the electrical performance of the gage.

It is thus seen that the invention provides an improved gage, an improved gage installation and an improved method of making a gage installation in which the objects of the invention are fully attained. The installation can be made by relatively unskilled workers.

While one embodiment has been disclosed by way of illustration, it is to be understood that there may be various embodiments and modifications within the general scope of the invention.

What is claimed is:

1. The method of making an electrical resistance strain gage installation on an electrically conductive test body, which comprises, providing a thin sheet metal foil resistor gage with a heat-resistant insulating carrier backing sheet with the metal foil gage exposed on one side, laying down on the test body a thin porous heat-resistant insulating sheet and a flowable cement, the said insulating sheet having a degree of porosity which permits the cement to pass freely therethrough, placing the gage with the metal face down on the porous insulating sheet and cement, and pressing out the cement until substantially only the thickness of the porous insulating sheet is secured between the gage and the test body with the cement in the pores of the insulating sheet directly bonding the metal foil gage to the test body.

2. The method of making an electrical resistance strain gage installation on an electrically conductive test body, which comprises, providing a gage unit having a thin foil metallic resistor gage with a heat-resistant insulating carrier backing sheet with the metal foil resistor gage exposed on one side, laying down on the test body a thin flexible insulating sheet of porous woven glass fabric and a heat-resistant flowable cement, the said insulating sheet having a degree of porosity which permits the cement to pass freely therethrough, placing the gage with the resistor side down on the glass fabric sheet and cement, and squeezing out cement and curing to leave substantially only the thickness of the glass fabric sheet between the resistor and the test body with the cement in the pores of the glass fabric sheet directly bonding the resistor to the test body.

3. The method of making an electrical resistance strain gage installation on an electrically conductive test body, which comprises providing a gage unit having a thin foil metallic resistor gage with terminal extensions and a heat-resistant insulating carrier backing sheet with solder connection holes filled and covered with a heat-resistant material over the terminals, the metallic resistor gage being exposed on one side of said backing sheet, laying down on the test body a thin flexible porous heat-resistant insulating sheet and a heat-resistant flowable cement, the said insulating sheet having a degree of porosity which permits the cement to pass freely therethrough, placing the gage with the resistor side down on the porous insulating sheet, pressing on the back to squeeze out cement with the cement in the pores of the insulating sheet directly bonding the resistor to the test body, cleaning the compound out of the holes in the carrier backing sheet, and soldering leads to said terminals by a solder joint through said holes.

References Cited in the file of this patent
UNITED STATES PATENTS

| | | |
|---|---|---|
| 2,438,205 | Coates | Mar. 23, 1948 |
| 2,569,499 | Shoub | Oct. 2, 1951 |
| 2,621,276 | Howland | Dec. 9, 1952 |
| 2,715,666 | Stinchfield | Aug. 16, 1955 |